United States Patent
Anderson et al.

(10) Patent No.: US 7,007,815 B2
(45) Date of Patent: Mar. 7, 2006

(54) PALLET RACK WITH CAMBER BEAMS

(75) Inventors: Jayce S. Anderson, Stevens Point, WI (US); Gary J. Rosenberg, Stevens Point, WI (US); Steven E. Krueger, Stevens Point, WI (US); William R. Sniff, Stevens Point, WI (US)

(73) Assignee: Steel King Industries, Inc., Stevens Point, WI (US)

( * ) Notice: Subject to any disclaimer, the term of this patent is extended or adjusted under 35 U.S.C. 154(b) by 101 days.

(21) Appl. No.: 10/357,732

(22) Filed: Feb. 4, 2003

(65) Prior Publication Data

US 2004/0155003 A1 Aug. 12, 2004

(51) Int. Cl.
*A47F 5/00* (2006.01)

(52) U.S. Cl. ............... 211/191; 211/206; 211/183; 211/189; 52/223.14

(58) Field of Classification Search ............... 211/189, 211/190, 187, 191, 186, 182, 183, 204, 206; 52/223.1, 223.8, 223.11, 223.14
See application file for complete search history.

(56) References Cited

U.S. PATENT DOCUMENTS

| | | | | |
|---|---|---|---|---|
| 3,092,396 A | | 6/1963 | Thomas | 280/106 |
| 3,221,894 A | * | 12/1965 | Knuth | 211/134 |
| 3,422,962 A | * | 1/1969 | Burns et al. | 211/191 |
| 3,463,325 A | * | 8/1969 | Zagotta et al. | 211/191 |
| 3,647,080 A | * | 3/1972 | Denny | 211/191 |
| 3,751,064 A | | 8/1973 | Goodson, Jr. | 280/106 |
| 3,928,905 A | | 12/1975 | Atwater | 29/446 |
| 3,971,179 A | * | 7/1976 | Bodocsi et al. | 52/223.11 |
| 4,586,646 A | * | 5/1986 | Booher | 228/44.3 |
| 5,042,396 A | | 8/1991 | Shuert | 108/51.1 |
| 5,301,482 A | * | 4/1994 | Aspenwall | 52/223.1 |
| 5,687,653 A | | 11/1997 | Bumgarner | 108/51.1 |
| 5,809,907 A | | 9/1998 | Bumgarner | 108/51.11 |
| 6,003,697 A | | 12/1999 | Ferchat et al. | 211/189 |
| 6,317,981 B1 | | 11/2001 | Smith | 29/897.35 |
| 6,434,893 B1 | * | 8/2002 | Quenzi | 52/126.1 |
| 2003/0089050 A1 | * | 5/2003 | Tipping et al. | 52/127.2 |

* cited by examiner

Primary Examiner—Jennifer E. Novosad

(57) ABSTRACT

A storage rack has upright columns supporting vertically cambered beams having step box or channel shapes accommodating a generally horizontal deck for carrying pallets and product loads. The beams have upward cambers or convex curvatures that increase the load carrying capacity of the rack.

16 Claims, 4 Drawing Sheets

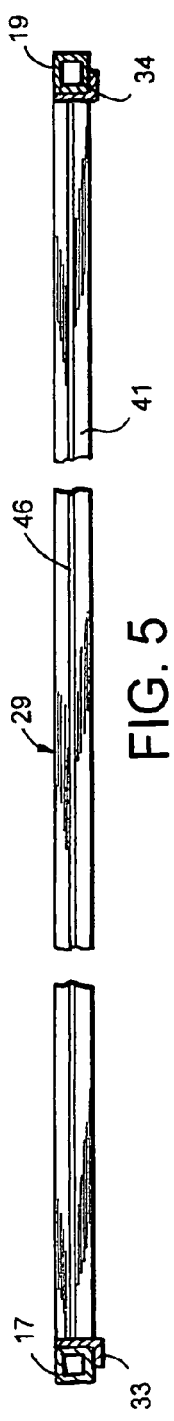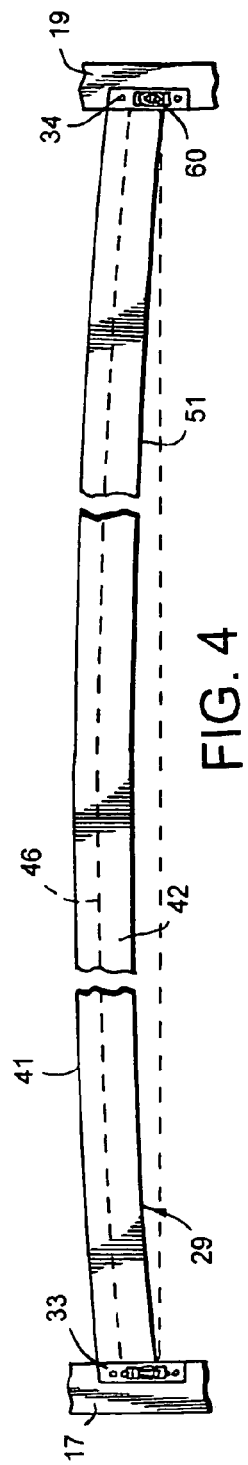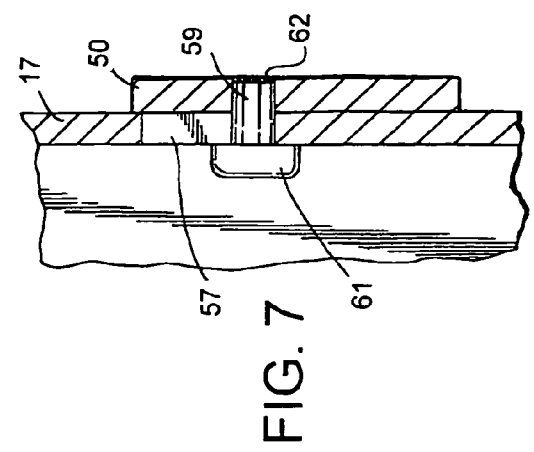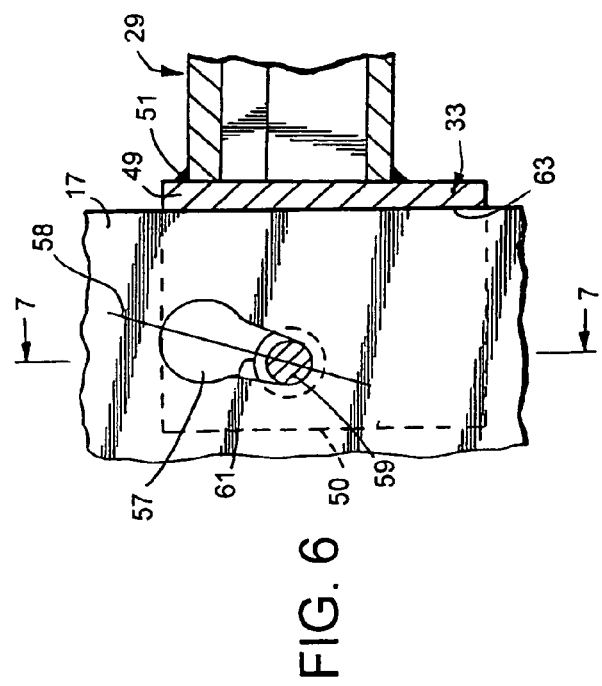

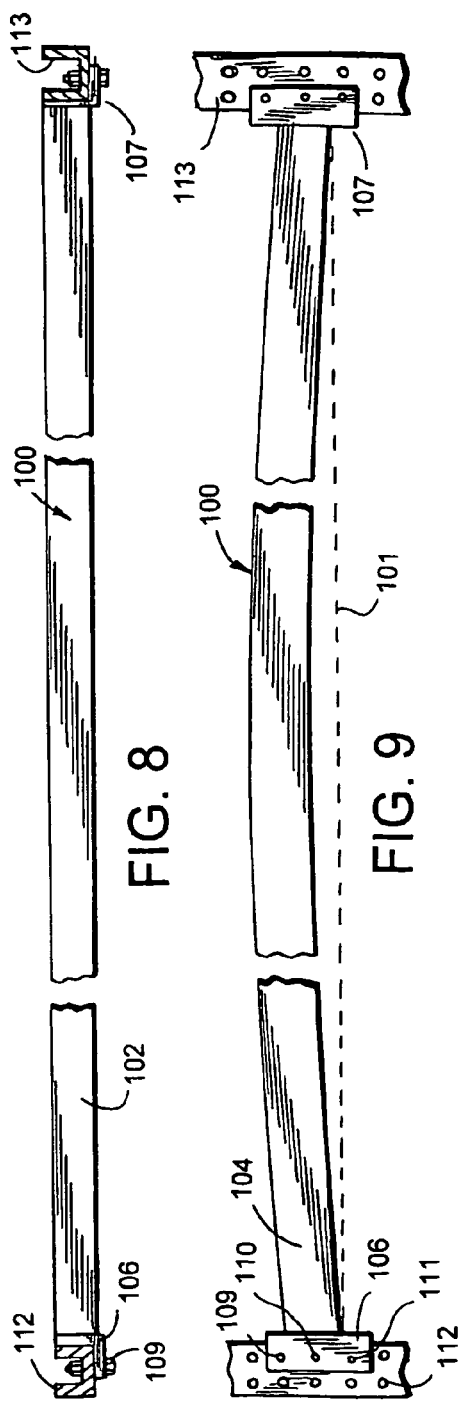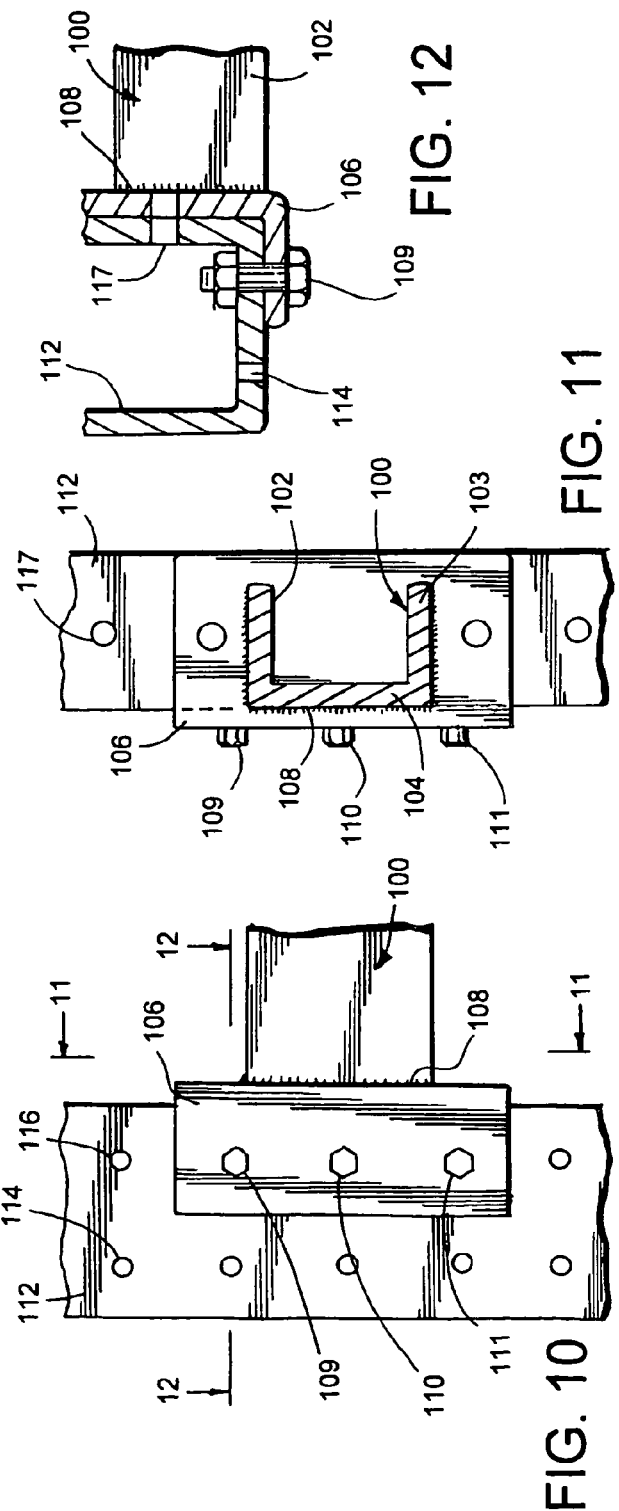

PALLET RACK WITH CAMBER BEAMS

FIELD OF THE INVENTION

The invention is in the art of storage racks for accommodating products and pallets for holding products and containers. The particular storage racks of the invention have upright columns and beams attached to the columns with boltless or bolted connectors.

BACKGROUND OF THE INVENTION

Pallet racks are in common use in product distribution centers, product and parts storerooms, and retail home center and food stores. The pallet racks have upright tubular or channel columns supporting straight horizontal beams. Cross beams and decks mounted on the horizontal beams are used to support pallet loads and products. The strength and rigidity of pallet racks have been increased by using closed tubular steel columns and tubular high strength steel horizontal beams. Additional pallet rack strength has been achieved by increasing the size and weight of the columns and horizontal beams. This increases the manufacturing costs and weight of the pallet racks and shipping cost of columns and horizontal beams to the assembly locations. Increasing the size of the columns and horizontal beams does not utilize all of the intrinsic strength of the steel of these structures. Building and design codes limit the amount of load weight that can be supported by a horizontal beam of a pallet rack. The maximum load weight on a horizontal beam is determined by the beam's downward deflection or flexing from a straight or linear horizontal shape to a downward concave shape. The maximum deflection is equal to $\frac{1}{180}$th of the length or span of the beam.

SUMMARY OF THE INVENTION

The storage rack of the invention has elongated beams attached to upright columns with connectors. The beams have cambers or upward convex curvatures along the lengths thereof. The upward convex curvatures of the beams increases the local carrying capacity of the beams. In use, a portion of the weight of the load on the beams is taken up by the amount of weight required to overcome or flex the beams toward a linear straight shape. The upward cambers of the beams establishes additional useable deflection of the beams which increases the amount of load weight that can be supported on the beams to make the beams deflect to $\frac{1}{180}$th of the spans of the beams below a horizontal plane. The load carrying capacity of the rack is increased without increasing size and weight of the beams and columns supporting the beams.

A preferred embodiment of the storage rack has a first upright frame having a pair of connected upright columns laterally spaced from a second upright frame having a pair of connected upright columns. A pair of parallel beams for supporting a load extend between the first and second pairs of columns. Each beam has a step box shape and a camber or an upward convex curvature along the entire length thereof. An example of the convex curvature is a curvature of $\frac{1}{32}$ inch for each foot of beam length. An eight-foot beam has a $\frac{1}{4}$ inch space between the center of the beam and a horizontal plane. The beams are deformed from linear straight step box steel beams into beams having upward convex curvatures. A deck extends between and is mounted on the parallel beams. The load capacity of pallets on the deck and beams is increased over conventional horizontal beam racks as a portion of the weight of the load is taken up by the amount of load weight required to overcome the cambers or convex curvature of the beams toward straight and concave configurations. Boltless connectors secured to opposite ends of each beam have a plurality of studs with heads that cooperate with keyhole slots in the columns to releasably connect the beams to the columns. In an alternative embodiment of the storage rack, the beams are channel members having cambers or upward convex curvatures along the entire length thereof. Connectors secured to opposite ends of the beams are secured with bolts to upright columns. The upward cambers of the beams creates additional useable deflection requiring additional load weight to deflect the beams to a horizontal shape and further to a concave shape up to $\frac{1}{180}$th the span of the beams below a horizontal plane.

DESCRIPTION OF THE DRAWING

FIG. 4 is an enlarged foreshortened side elevational view of a cambered beam of the storage rack of FIG. 1;

FIG. 5 is a top plan view of FIG. 4;

FIG. 6 is an enlarged sectional view taken along line 6—6 of FIG. 2;

FIG. 7 is a sectional view taken along line 7—7 of FIG. 6;

FIG. 8 is a foreshortened top plan view, partly sectioned, of a modification of the cambered beam connected to upright columns;

FIG. 9 is a foreshortened side elevational view of the cambered beam of FIG. 8;

FIG. 10 is an enlarged side elevational view of an end of the cambered beam of FIG. 9 secured to an upright column;

FIG. 11 is a sectional view taken along line 11—11 of FIG. 10; and

FIG. 12 is a sectional view taken along line 12—12 of FIG. 10.

DESCRIPTION OF THE INVENTION

Figure 1:
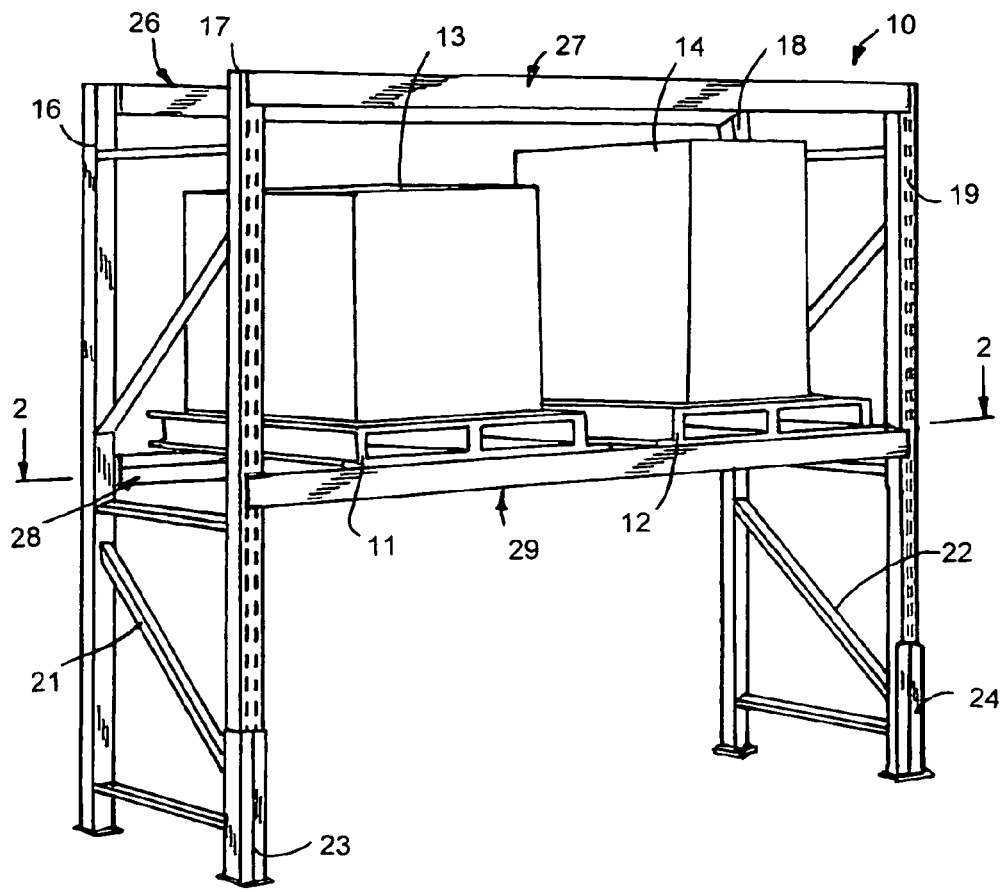
FIG. 1 is a perspective view of a storage rack having cambered beams connected to upright frames having a pair of columns.

A storage rack 10, shown in FIG. 1, used in retail and warehouse environments for storing products and pallets 11 and 12 supporting containers or cartons containing products. Rack 10 has upright frames having columns or posts 16, 17, 18 and 19. Each column has vertical rows of keyhole slots. Columns 16–19 are tubular metal members having continuous weld construction which provides more torsional strength than roll formed U-shaped rack columns. The upright frames have cross members 21 extended between and secured with welds to columns 16 and 17. Cross members 22 extend between and are secured with welds to columns 18 and 19. The adjacent upright frames and columns 16, 17 and 18, 19 are identical in structure. Additional frames can be used to extend the length of the storage rack. The vertical length of columns 16–19 can vary to increase the number of rack shelves. The size of columns 16–19 can be changed to increase their structural strength. The columns can be upright channel members, H-shaped, T-shaped, I members, semi-cylindrical or cylindrical members.

Front columns 17 and 19 are in positions where they might accidentally be hit with product handling vehicles, such as fork lifts. The metal tubular configuration of columns 17 and 19 reduces deformation in the direction of impact forces applied thereto. Lower portions of column 17 and 19 are guarded with column protectors 23 and 24. Protectors 23 and 24 having upright V-shaped bodies releasable mounted and locked on columns 17 and 19. Other types of column protectors can be used to protect columns 17 and 19 from impact forces caused by product handling vehicles.

Figure 2:
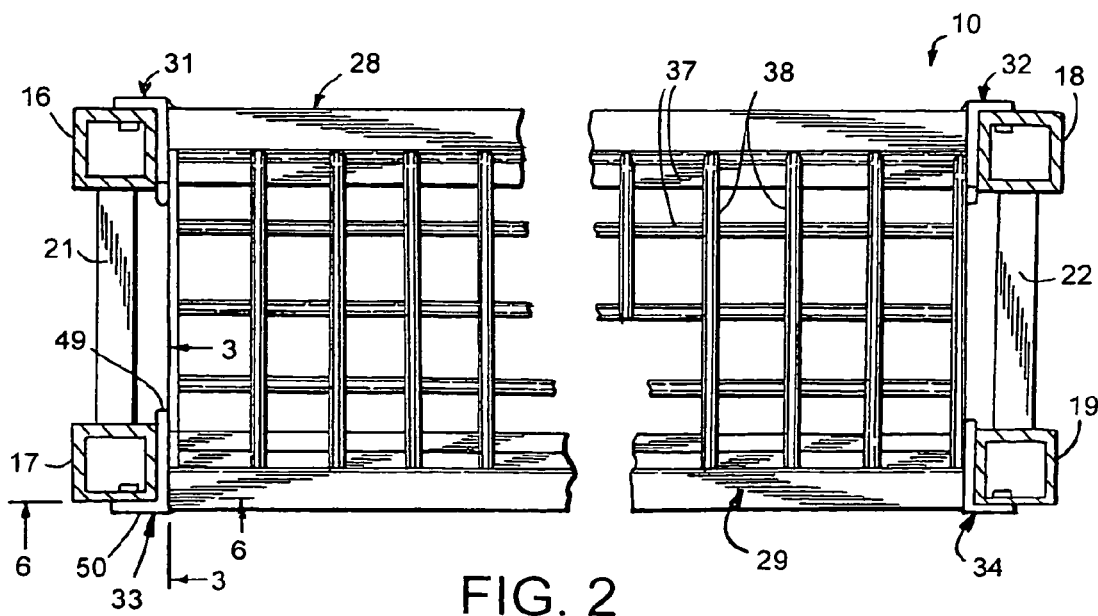
FIG. 2 is an enlarged foreshortened sectional view taken along the line 2—2 of FIG. 1.

Upper camber beams 26 and 27 and lower camber beams 28 and 29 extend between the first and second frames are connected to columns 16–19. As shown in FIG. 2, releasable connectors 31 and 32 secured with welds to opposite ends of beam 28 are releasably mounted on columns 16 and 18. Releasable connectors 33 and 34 mount opposite ends of beam 29 to columns 17 and 19. Studs, bolts and other types of fasteners secure connectors 33 and 34 to columns 17 and 19.

A deck comprising a grid of crossed rods 37 and 38 extended between and mounted on beams 26 and 27 supports pallets 11 and 12 and other products on rack 10. Cross plates, bars, sheet metal panels, and plywood sheets can be used as decks supported on beams 26 and 27. The use of the deck with beams 26 and 27 is optional as loaded pallets can be supported directly on the beams.

Referring to FIGS. 2, 3, 6 and 7, connector 33 has right angle flanges or plates 49 and 50 located in flat surface engagement with adjacent sides of column 17. A continuous weld 51 secures the end of beam 29 to plate 49. Plate 49 has vertically spaced holes 52 and 53 and slots 54 and 56 for accommodating connectors or fasteners useable to secure beam 29 to columns having different sizes and keyhole patterns. As shown in FIGS. 6 and 7, column 17 has a keyhole slot 57 in its wall facing plate 50. The remaining keyhole slots in column 17 have the same shape as keyhole slot 57. A rivet or stud 59 joined to an enlarged head 61 is press formed into holes in plate 50. Other types of fasteners can be used to secure stud 59 to plate 50. Body 59 extends through slot 57 having a downwardly and inwardly inclined axis 58. Connector 33 is mounted on column 17 by inserting head 61 through the upper large end of keyhole slot 57 and then moving connector 33 downwardly along the inclined axis 58 of keyhole slot 57. When head 61 engages the inside of column 17 connector 33 is mounted on column 17. Three connecting studs or rivets are used to mount connector 33 on column 17 to increase the weight carrying strength of connector 33. The number of studs used to mount connector 33 on column 17 can be two or more studs. Alternatively, bolts can be used to secure connector 33 to column 17. The connecting studs cooperate with the keyhole slots in column to provide a secure assembly which is achieved without the use of bolts and tools. Releasable latches 60 on the connectors 33 and 34 cooperate with the columns 17 and 19 to prevent inadvertent release of the connectors from the columns.

Figure 3:
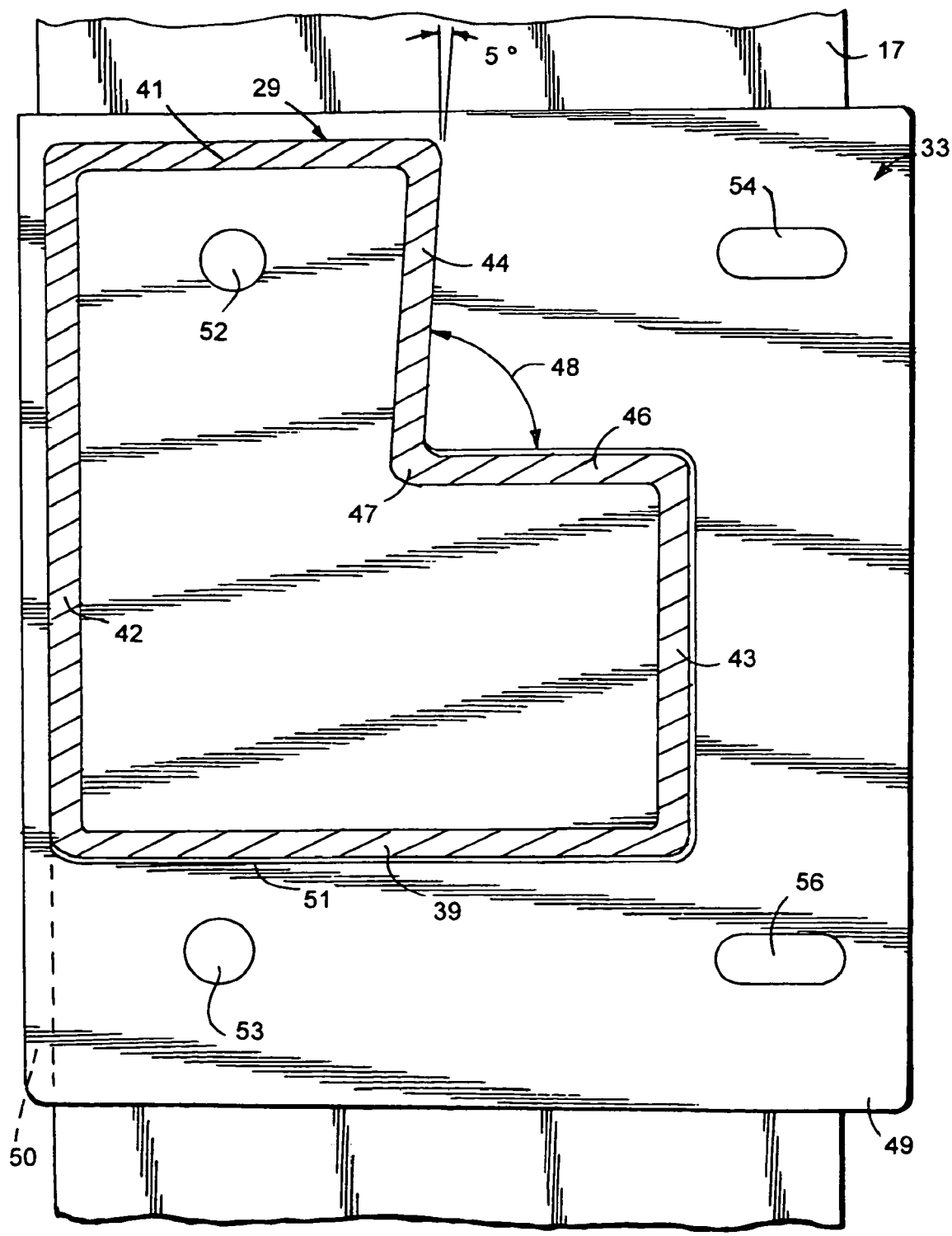
FIG. 3 is an enlarged sectional view taken along line 3—3 of FIG. 2.

As shown in FIG. 3, camber beam 29 is an elongated tubular metal member having a cross section step box configuration comprising a transverse bottom wall 39 and top wall 41 joined with an upright side wall 42. The inner edge of wall 39 is joined to an inside upright wall 43. Angle orientated walls 44 and 46 are joined to walls 41 and 43. A rounded corner 47 joins walls 44 and 46. The angle 48 between walls 44 and 46 is less than 90 degrees. Wall 44 slopes downwardly and inwardly in an upright direction. The slope of wall 44 is about 5 degrees relative to a vertical plane. The slope or upright incline of wall 44 can vary or be parallel to wall 42. Camber beam 28 has the same structure as camber beam 29.

Camber beam 29, shown in FIG. 4, has an upward convex curvature or camber along its length relative to a horizontal plane shown as a broken line 30 in FIG. 4. The curvature is a broad arch of a circle extended along the entire length of the beam. An example of the camber or upward curvature of beam 29 is 1/32 inch for each foot of beam length. An eight-foot beam has a camber of 1/4 inch. The vertical distance between horizontal plane 30 and the center of an eight-foot beam is 1/4 inch. The camber or upward convex curvature of beam 28 can vary with the length, shape and material of the beam. Beam 29 is fabricated from an existing linear or straight tubular metal member. The tubular metal member is cold worked or pressed to deform and pre-stress the metal member to a convex curved configuration. Beam 28 has the same upward convex curvature or camber as beam 29. Camber beams 28 and 29 increase the load carrying capacity of rack 10 without any increase in size or weight of the beams. When loads, such as heavy products on pallets, are placed on camber beams 28 and 29 and/or the deck mounted on the beams, a portion of the weight of the load is taken up by the amount of weight required to overcome the convex curvature or bend strength of beams 28 and 29 and move the beams toward flat or linear configurations or downward concave configurations. When the loads on camber beams 28 and 29 are removed, the beams 28 and 29 return to their camber shapes as the loads have insufficient weight to deform or exceed the elastic limits of beams 28 and 29. The upward cambers of beams 28 and 29 establish additional useable deflection of the beams which increases the amount of load weight that can be supported on the beams before they deflect downward to 1/180th of the span of the beams below a horizontal plane.

An alternative beam 100 having an upright camber or convex configuration along its entire length is shown in FIGS. 8 to 12. Beam 100 arches upwardly from a horizontal plane shown as a broken line 101 in FIG. 9. The curvature of beam 100 is along an arc of a circle extended along the span or length of beam 100. As seen in FIG. 11, beam 100 is a channel member having horizontal parallel flanges 102 and 103 joined to a flat upright base 104. Beam 100 can have other shapes such as I-beans or T-beams. Connectors 106 and 107 are secured with welds 108 to opposite ends of beam 100. Connectors 106 and 107 are identical structures. FIGS. 10 to 12 show the details of connector 106. Connectors 106 and 107 are right angle members secured with bolts 109, 110, and 111 upright column or posts 112 and 113. Columns 112 and 113 are part of upright frames located at opposite ends of beam 100. As shown in FIG. 10, column 112 has vertical rows of holes 114 and 116 for accommodating the bolts 109–111 that retain the right angle connector 106 in surface engagement with adjacent flat surfaces of column 112. The side flanges of column 112 has additional holes 117 for additional bolts for attaching connector 106 to column 112. Connector 106 can be attached to column 112 with studs as shown in FIGS. 6 and 7.

Pallet racks have pairs of generally parallel beams, such as beam 100, attached to upright columns or posts of upright frames. Camber beams 100 in the pallet racks increase the load weight carrying capacity of the rack without any increase in the size or weight of the beams. When loads, such as heavy products on pallets, are placed on camber beams 100, a portion of the weight of the load is taken up by the amount of weight required to overcome the convex curvature or bend strength of beams 100 and move the beams toward concave curved configurations. When the loads on camber beams 100 are removed, the beams 100 return to their camber shapes as the loads have insufficient weight to deform or exceed the elastic limits of beams 100. The upward cambers of beams 100 establish additional useable deflection of the beams which increases the amount of load weight that can be supported on the beams before they deflect downward to $\frac{1}{180}$th of the span of the beams below a horizontal plane.

Preferred embodiments of the storage rack with camber beams has been illustrated and described. Changes in structures, shape of the cambered beams, the camber arc of the beams, arrangement of structures and combinations of parts and connections may be made by persons skilled in the art, without departing from the invention.

The invention claimed is:

1. A storage rack comprising:
   a first upright frame having a first pair of upright columns,
   a second upright frame having a second pair of upright columns laterally spaced from the first pair of upright columns,
   at least one pair of beams for supporting a load extended horizontally between said first and second pairs of upright columns, each of said beams is a one-piece tubular box beam having generally horizontal step portion having opposite ends, said box beam is a linear straight one-piece tubular box beam cold pressed deformed into a beam having an upward convex curvature along the length thereof, a deck extended between and supported on the step portion of each beam for accommodating a load whereby a portion of the weight of the load on the deck is taken up by the amount of weight required to bend the convex curved beam downward toward a generally linear horizontal configuration, and
   connectors attaching the ends of the beams to the first and second columns.

2. The rack of claim 1 wherein: said upward convex curvature of each beam is an arc of a circle.

3. The rack of claim 1 wherein: said upward convex curvature of each beam is about $\frac{1}{32}$ inch for each foot of beam length along the length of the beam.

4. The rack of claim 1 wherein: said connectors and columns have cooperating members and openings to releasably attach the connectors to the columns and releasable latches to prevent inadvertent release of the connectors from the columns.

5. A storage rack comprising: a first upright frame having a first pair of upright columns, a second upright frame having a second pair of upright columns laterally spaced from the first pair of upright columns, at least one pair of beams for supporting a load extended horizontally between said first and second pairs of upright columns, each of said beams is a channel member having opposite ends, said channel member being cold pressed to deform a linear straight channel member into a beam having an upward convex curvature along the length thereof, a deck extended between and supported on the channel member for accommodating a load whereby a portion of the weight of the load on the deck is taken up by the amount of weight required to bend the convex curved beam downward toward a generally linear horizontal configuration, connectors releasably attaching the ends of the channel members to the first and second columns, and releasable latches to prevent inadvertent release of the connectors from the colums.

6. The rack of claim 5 wherein: said connectors and columns having cooperating members and openings for releasably mounting the connectors on the columns.

7. A storage rack comprising:
   first and second upright columns laterally spaced from each other,
   beam means for supporting a load extended between said first and second columns, said beam means having elongated beams with upward convex curvatures along the lengths thereof, each of said beams is a linear straight beam cold pressed deformed into a beam having said upward convex curvature along the length of the beam whereby a portion of the weight of the load on the beams is taken up by the amount of weight required to overcome the convex curvatures of the beams, and connector means for mounting the beam means on the first and second columns.

8. The rack of claim 7 wherein: said upward convex curvature of each beam is about $\frac{1}{32}$ inch for each foot of beam length.

9. The rack of claim 7 wherein: each beam is a step box beam.

10. The rack of claim 7 wherein: each beam is a channel member.

11. The rack of claim 7 wherein: each of said beams is a one-piece step box beam deformed from a linear straight one-piece step box beam into a step box beam having said upward convex curvature.

12. The rack of claim 7 wherein: each beam is a channel member deformed from a linear straight channel member into a beam having said upward convex curvature along the length thereof.

13. The rack of claim 7 wherein: said connector means and beam means have cooperating means for releasably mounting the connector means on the columns and releasable latches for preventing inadvertent release of the connector means from the columns.

14. A storage rack comprising:
    first and second generally upright columns laterally spaced from each other,
    a plurality of generally horizontal one-piece step box beams for supporting loads extended between said first and second columns, each of the step box beams having upward convex curvatures of about $\frac{1}{32}$ inch for each foot of beam length along the length thereof, each of said beams is a linear straight beam cold pressed deformed into a beam having said upward convex curvature along the length of the beam whereby a portion of the weight of the load on the step box beams is taken up by the amount of weight required to overcome the convex curvatures of the step box beams, and
    connectors on the step box beams operable to attach the step box beams to the upright first and second columns.

15. The rack of claim 14 wherein: said connectors and columns having cooperating means for attaching the connectors to the columns.

16. The rack of claim 14 including: a deck for supporting a load mounted on said step box beams.

* * * * *